(12) United States Patent
Sawai

(10) Patent No.: US 7,306,512 B2
(45) Date of Patent: Dec. 11, 2007

(54) DOOR DRIVING SYSTEM

(75) Inventor: Takuhiko Sawai, Kariya (JP)

(73) Assignee: DENSO Corporation, Kariya (JP)

( * ) Notice: Subject to any disclaimer, the term of this patent is extended or adjusted under 35 U.S.C. 154(b) by 168 days.

(21) Appl. No.: 11/085,479

(22) Filed: Mar. 21, 2005

(65) Prior Publication Data

US 2005/0210753 A1 Sep. 29, 2005

(30) Foreign Application Priority Data

Mar. 24, 2004 (JP) ............................. 2004-087736

(51) Int. Cl.
*B60H 1/34* (2006.01)
(52) U.S. Cl. ............................................ 454/155
(58) Field of Classification Search ................... 49/333, 49/334, 397, 42, 338; 74/838; 137/353; 296/190.09; 251/129.11, 298, 299; 454/127, 454/155, 156
See application file for complete search history.

(56) References Cited

U.S. PATENT DOCUMENTS 1,282,128 A * 10/1918 Rosentreter ................. 160/117
3,087,720 A * 4/1963 Catlett ............................ 49/30
4,872,285 A * 10/1989 Appelmann ..................... 49/42
5,160,115 A 11/1992 Ito et al.
5,881,497 A * 3/1999 Borgardt ....................... 49/139

FOREIGN PATENT DOCUMENTS

JP 2001-080347 3/2001

* cited by examiner

*Primary Examiner*—Jerry Redman
(74) *Attorney, Agent, or Firm*—Harness, Dickey & Pierce, PLC

(57) ABSTRACT

A door driving system includes a door for controlling an air flow, a transmission mechanism for operating the door, and a driving motor for exerting a rotation force at the transmission mechanism. The door has a body portion and a rotation portion, which has an approximate cylinder shape and is integrally rotatable with the body portion. The transmission mechanism converts the rotation force of the driving motor to an axial force in an axis direction thereof, and then converting the axial force to a driving force for rotating the rotation portion. The transmission mechanism is arranged at an inner side of the rotation portion. The driving motor is constructed of a DC motor. Accordingly, the door driving system is compact and light.

11 Claims, 4 Drawing Sheets

FIG. 5A
FIG. 5B
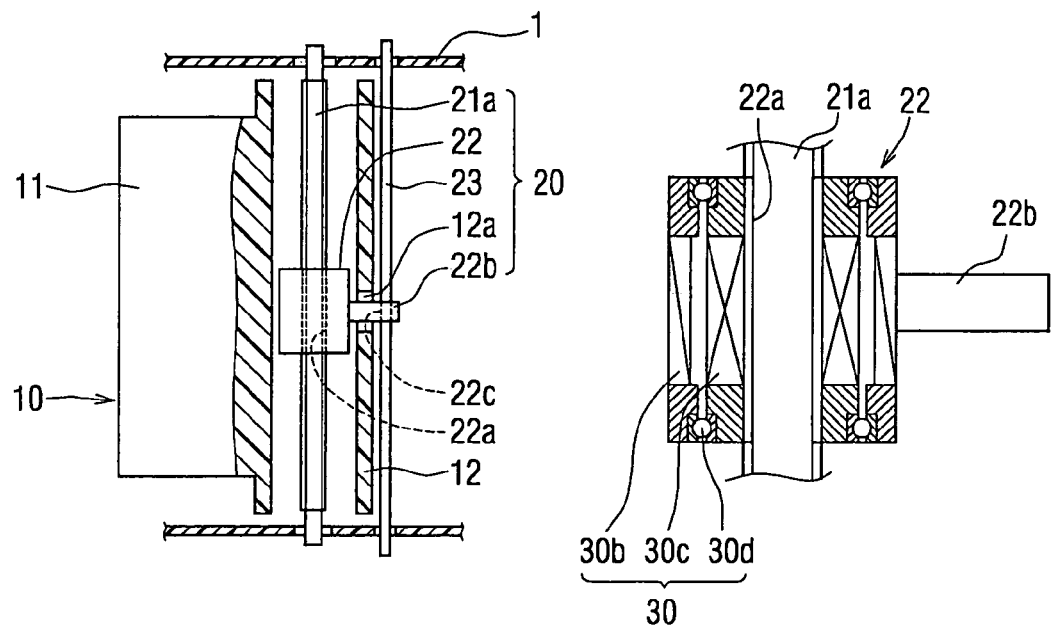
FIG. 6
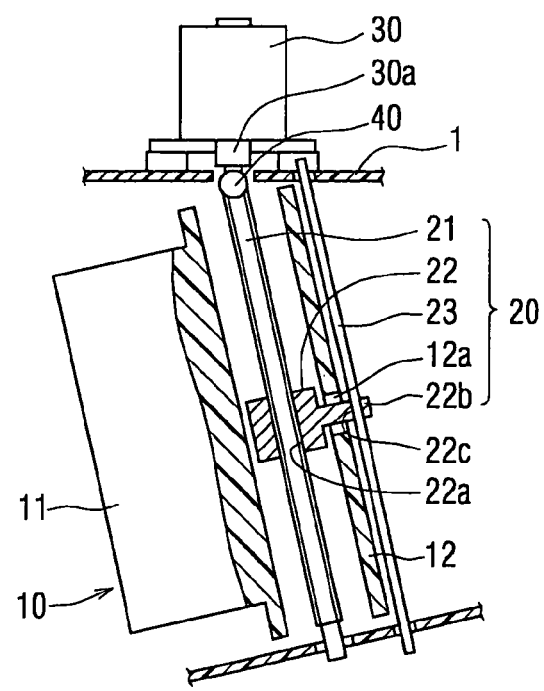

DOOR DRIVING SYSTEM

CROSS REFERENCE TO RELATED APPLICATION

This application is based on Japanese Patent Application No. 2004-87736 filed on Mar. 24, 2004, the disclosure of which is incorporated herein by reference.

FIELD OF THE INVENTION

The present invention relates to a door driving system for driving a door which controls an air flow or the like.

BACKGROUND OF THE INVENTION

In general, referring to FIG. 7, a door driving system includes a door 110 for controlling an air flow through an air passage defined by a case 100, a link mechanism 120 (transmission mechanism) for operating the door 110, and a driving motor 130 for exerting a rotation force at the link mechanism 120. The door 110 is rotatably mounted in the case 100. The link mechanism 120 and the driving motor 130 are arranged outside the case 100.

The driving motor 130 is constructed of a servomotor, in which a DC motor for generating the rotation force, multiple deceleration gears for increasing the rotation force, a potentiometer for detecting a rotation position and the like are built. The servomotor further has a link unit mounted thereout for improving a stop position accuracy of a driving shaft of the servomotor.

However, because both the servomotor and the link mechanism 120 include numerous components, the door driving system occupies a large space outside the case 100. For example, referring to JP-2001-80347A, the link mechanism 120 and the servomotor of width 60 mm×length 80 mm×height 40 mm are to be mounted outside the case 100. Moreover, it is difficult to reduce the door driving system in size and weight.

SUMMARY OF THE INVENTION

In view of the above-described disadvantages, it is an object of the present invention to provide a door driving system which is compact and lightweight. In the door driving system, both a driving motor and a transmission mechanism are simplified, and at least the transmission mechanism is arranged in a case.

According to the present invention, a door driving system includes a door having a body portion and a rotation portion which has an approximate cylinder shape and is integrally rotatable with the body portion, a transmission mechanism which is arranged at an inner side of the rotation portion to operate the door, and a driving motor which exerts a rotation force at the transmission mechanism. The transmission mechanism converts the rotation force to an axial force in an axis direction of the driving motor, and then converting the axial force to a driving force for rotating the rotation portion.

Because the transmission mechanism is arranged at the inner side of the rotation portion, the door driving system becomes compact and occupies a substantially small space outside the case.

Preferably, the transmission mechanism includes a first conversion unit for converting the rotation force to the axial force, and a second conversion unit for converting the axial force to the driving force to rotate the rotation portion. The first conversion unit includes a transmission member having a screw portion, and a rotation shaft which is rotatably mounted at the inner side of the rotation portion and driven by the rotation force of the driving motor. The rotation shaft is provided with a thread formed at a surface thereof. The screw portion is engaged with the thread, so that the transmission member slides in an axis direction of the rotation shaft responding to a rotation of the rotation shaft. The second conversion unit includes a pin portion which is integrated with the transmission member, and a ditch portion which is formed at the rotation portion and extends approximately helically with respect to an axis direction of the rotation portion. The pin portion is engaged with the ditch portion to be operatively associated with the rotation portion, so that the rotation portion is rotated responding to a sliding of the transmission member.

Accordingly, the door can be readily operated by the transmission mechanism, which is constructed of a few components. Therefore, the door driving system is reduced in size and weight.

More preferably, the driving motor is arranged at the inner side of the rotation portion and connected with the rotation shaft. Thus, the mounting space of the door driving system is further reduced.

More preferably, the driving motor is constructed of a DC motor or a step motor, thus becoming small and light.

BRIEF DESCRIPTION OF THE DRAWINGS

Other objects, features and advantages of the present invention will become more apparent from the following detailed description made with reference to the accompanying drawings, in which:

FIG. 5A is a schematic view showing a door driving system according to a third embodiment of the present invention, and FIG. 5B is a partially cross-sectional view showing a transmission member of the door driving system according to the third embodiment;

FIG. 6 is a schematic view showing a door driving system according to other embodiment of the present invention.

DETAILED DESCRIPTION OF THE PREFERRED EMBODIMENT

First Embodiment

A door driving system according to the first embodiment will be described with reference to FIGS. 1-3. The door driving system is suitably used for driving a control door 10 (door 10) such as a blow mode door and an air mixing door in an air conditioner for a vehicle. The blow mode door is opened or closed to control an air flow through a face blowing-out port, a defroster blowing-out port, a foot blowing-out port or the like. The opening degree of the air mixing door is adjusted to change the proportion between hot air and cold air which are to be blown into the passenger compartment of the vehicle, so that temperature of conditioned air is adjusted.

Figure 1:
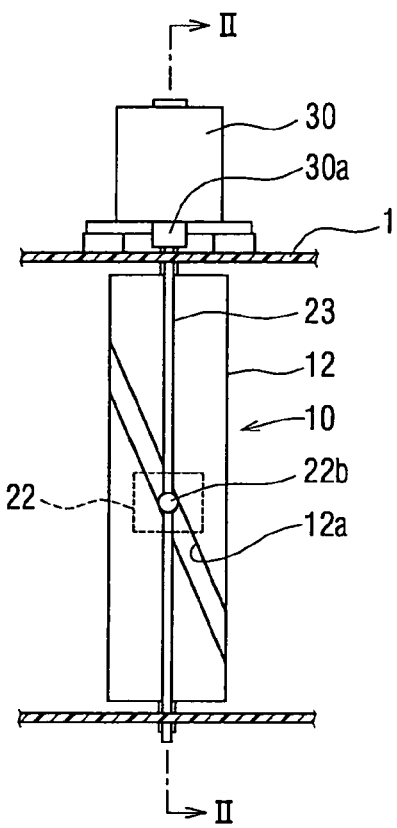
FIG. 1 is a schematic view showing a door driving system according to a first embodiment of the present invention.
Figure 2:
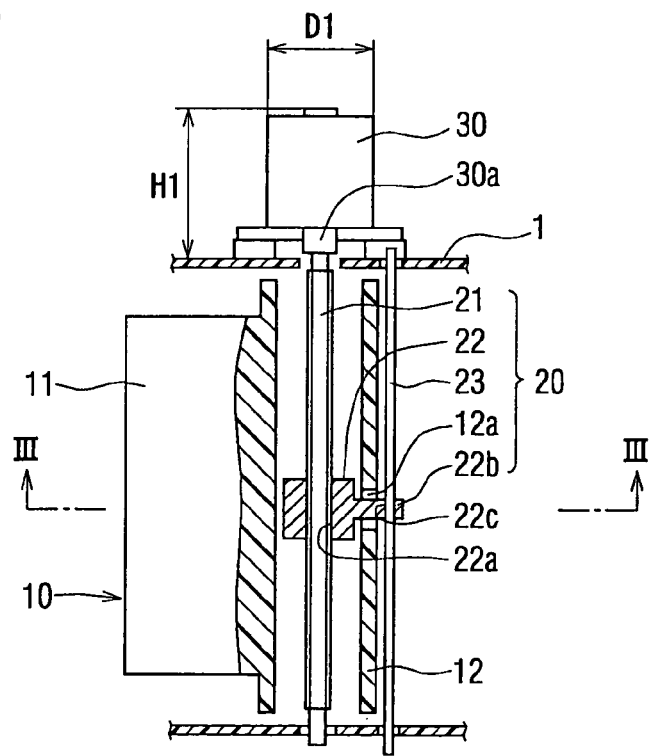
FIG. 2 is a sectional view taken along a line II-II in FIG. 1.
Figure 3:
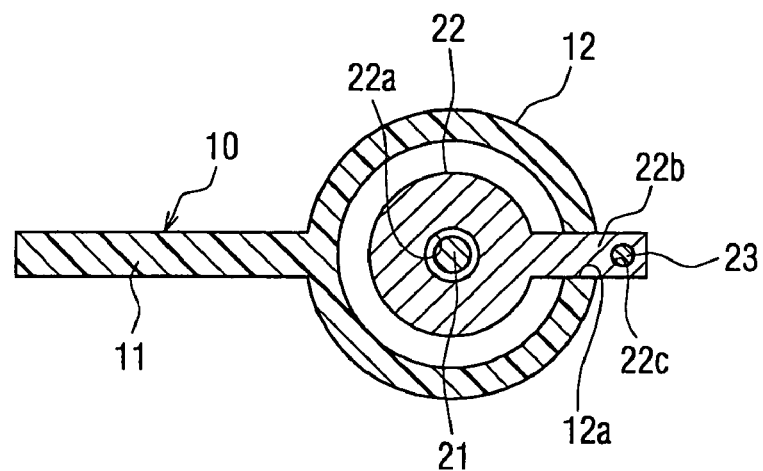
FIG. 3 is a sectional view taken along a line III-III in FIG. 2.

As shown in FIGS. 1-3, the door driving system includes the door 10, a transmission mechanism 20 for operating the door 10, and a driving motor 30 (motor) which exerts a rotation force at the transmission mechanism 20.

The driving motor 30 is constructed of a DC motor supplied with a direct-current power source. The driving motor 30 is mounted at an end of the outer surface of an air conditioner case 1 (case 1), and applies the rotation force to the transmission mechanism 20 through a driving shaft 30a of the driving motor 30.

The door 10 is made of a resin or the like and has a plate shape on the whole. The door 10 includes a rectangle-shape body portion 11 and a rotation portion 12, which has an approximate cylinder shape to accommodate the transmission mechanism 20 therein and is integrated with the body portion 11 at a width-direction end of the body portion 11. The rotation portion 12 is rotatably mounted in the case 1 and coaxial with the driving shaft 30a.

The transmission mechanism 20 includes a first conversion unit which converts the rotary force of the driving motor 30 to an axial force in the axis direction of the driving motor 30, and a second conversion unit which converts the axial force to a driving force for rotating the door 10 (rotation portion 12).

The first conversion unit includes a rotation shaft 21 which is rotatably mounted at the inner side of the rotation portion 12, and a transmission member 22 having a screw portion 22a, which is approximately coaxial with the rotation shaft 21 (rotation portion 12).

The rotation shaft 21, being approximately coaxially with the rotation portion 12, has an end protruding from the case 1 to be connected with the driving shaft 30a of the driving motor 30. Thus, the rotation shaft 21 can be driven to rotate when the driving motor 30 is energized.

The rotation shaft 21 is provided with a lead thread (thread) formed at the outer surface thereof. The screw portion 22a is engaged with the thread, so that the transmission member 22 can slide in an axial direction of the rotation shaft 21 responding to a rotation of the rotation shaft 21.

In this case, the rotation force exerted at the rotation shaft 21 by the driving motor 30 is increased to be converted to the axial force due to the engagement of the screw portion 22a with the thread. The axial force is applied to the screw portion 22a (transmission member 22), which slides along the rotation shaft 21.

The second conversion unit includes a pin portion 22b and a ditch portion 12a. The pin portion 22b is integrated with the transmission member 22 and approximately perpendicular to the rotation shaft 21. The ditch portion 12a is formed at the cylinder-shape rotation portion 12 (referring to FIG. 1), and extends approximately helically with respect to the axis direction of the rotation portion 12.

The pin portion 22b has an approximate stick shape and is inserted through the ditch portion 12a, so that an end of the pin portion 22b protrudes from the outer surface of the rotation portion 12. Thus, the transmission member 22 is operatively associated with the rotation portion 12. Therefore, when the transmission member 22 slides along the rotation shaft 21 responding to the rotation of the rotation shaft 21, the rotation portion 12 will have a rotation due to the engagement of the pin portion 22b with the ditch portion 12a, which approximately helically extends at the rotation portion 12. That is, the axial force is converted to the driving force rotating the rotation portion 12 (door 10).

Furthermore, the pin portion 22b is provided with a guide hole 22c, which penetrates the end located outside of the rotation/portion 12 and extends in the axis direction of the rotation portion 12. A guide unit 23 is mounted in the case 1 and inserted through the guide hole 22c. That is, the guide unit 23 is arranged parallel to the axial direction of the rotation portion 12, to guide the pin portion 22b to a motion in this axial direction. Therefore, the pin portion 22b can move along the ditch portion 12a with less looseness therebetween, thus improving a stop position accuracy of the door 10.

Next, the operation of the door driving system will be described.

When the driving motor 30 is energized, a rotation force is applied to the rotation shaft 21 through the driving shaft 30a, so that the rotation shaft 21 is rotated.

Due to the engagement of the screw portion 22a with the thread formed at the rotation shaft 21, the rotation force will be increased and converted to an axial force in the axial direction of the rotation shaft 21. The axial force is exerted at the screw portion 22a, so that the transmission member 22 (pin portion 22b) has a displacement in the axis direction of the rotation shaft 21.

Then, due to the engagement of the pin portion 22b with the ditch portion 12a formed at the rotation portion 12, the rotation portion 12 is rotated responding to the axial displacement of the pin portion 22b. Thus, the door 10 is operated to control the air flow or the like.

In this case, because the driving motor 30 is constructed of the DC motor instead of a servomotor which is larger, the driving motor 30 can be small-sized to have a diameter 15 mm-20 mm and a height 20 mm or so.

Figure 7:
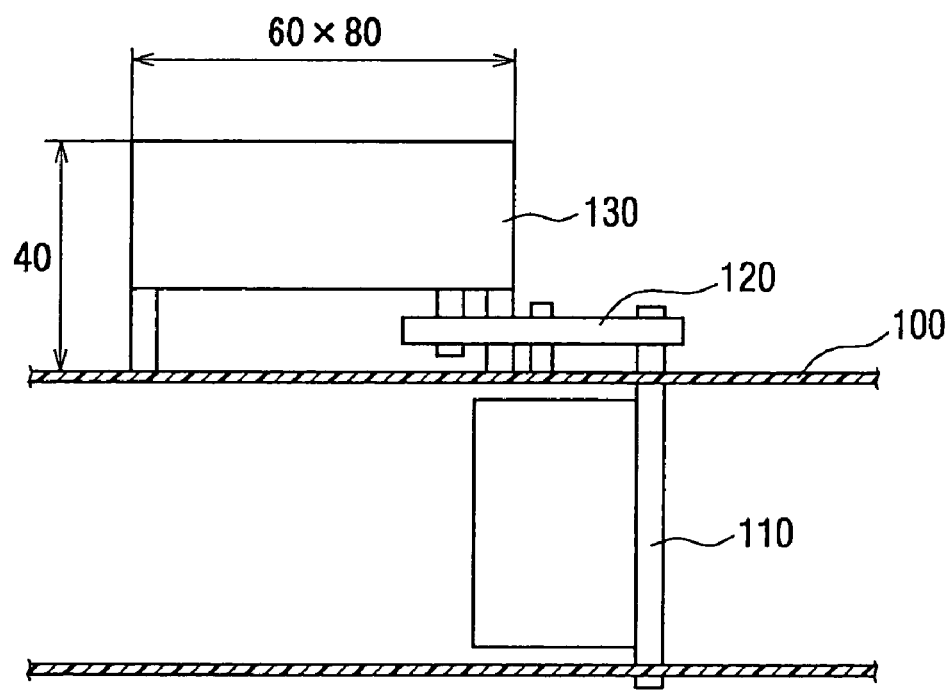
FIG. 7 is a schematic view showing a door driving system according to a prior art.

According to the present invention, the transmission mechanism 20 is arranged at the inner side of the cylinder-shape rotation portion 12 of the door 10. Thus, the door driving system can be substantially reduced in size and space occupied outside the case 1, as compared with that described in a prior art referring to FIG. 7.

Furthermore, the rotation force of the driving motor 30 is increased to be converted to the axial force due to the engagement of the screw portion 22a of the transmission member 22 with the thread formed at the rotation shaft 21. Thus, the rotation shaft 21 and the transmission member 22 construct the first conversion unit, which readily converts the rotation force to the axial force. According to the second conversion unit, the pin portion 22b is engaged with the ditch portion 12a, so that the axial force is readily converted to the driving force to rotate the rotation portion 12. Thus, the transmission mechanism 20 can be constructed with fewer components. Accordingly, the door driving system can become smaller and lighter.

Moreover, the guide unit 23 is inserted through the guide hole 22c formed at the pin portion 22b, to guide the pin portion 22b to the motion in the axis direction of the rotation portion 12. Accordingly, the pin portion 22b can be engaged with the ditch portion 12a with less looseness, thus improving the stop position accuracy of the door 10.

Second Embodiment

In the above-described first embodiment, the driving motor 30 is arranged outside the case 1. According to the second embodiment, the driving motor 30 is disposed in the case 1 at the upper side or the lower side thereof.

Figure 4:
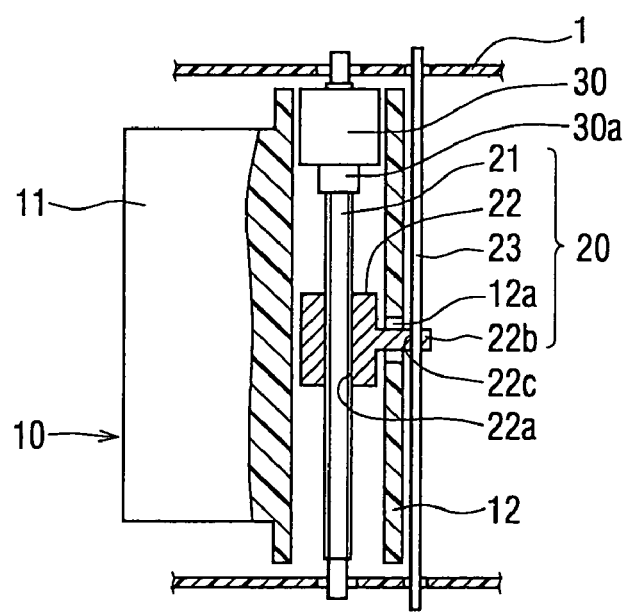
FIG. 4 is a schematic view showing a door driving system according to a second embodiment of the present invention.

For example, as shown in FIG. 4, the driving motor 30 is located at the inner side of the cylinder-shape rotation portion 12 and coaxially connected with the rotation shaft 21. Therefore, the door driving system becomes compacter and has a smaller mounting space outside the case 1.

In this embodiment, the structure of the door driving system which has not been described here is the same with the first embodiment.

Third Embodiment

According to the third embodiment, referring to FIGS. 5A and 5B, the door driving system includes the door 10, the transmission mechanism 20 and the driving motor 30, which is integrated with the transmission member 22.

Specifically, the driving motor 30 includes a stator coil 30b, a rotor 30c and a bearing 30d, which are arranged at the peripheral side of the screw portion 22a.

Similarly to the first and second embodiments, the door 10 has the body portion 11 and the cylinder-shape rotation portion 12. The transmission mechanism 20 is provided with the first conversion unit and the second conversation unit. The second conversation unit includes the pin portion 22b integrated with the transmission member 22 and the ditch portion 12a formed at the rotation portion 12.

According to the third embodiment, the first conversion unit includes a shaft 21a which is inserted through the rotation portion 12, and the transmission member 22 having the screw portion 22a, which is approximately coaxial with the shaft 21a. The shaft 21a is fixed to the case 1.

The screw portion 22a is rotatably mounted at the inner side of the driving motor 30. When the driving motor 30 is energized, the screw portion 22a will be driven by the rotation force of the driving motor 30. In this case, the shaft 21a itself does not rotate, which is different from the rotation shaft 21 of the first and second embodiments.

Moreover, the shaft 21a is provided with a lead thread (thread) formed at the outer surface thereof. The screw portion 22a is engaged with the thread, so that the transmission member 22 (pin portion 22b) will slide in the axis direction of the shaft 21a responding to the rotation of the screw portion 22a. That is, the rotation force is converted to the axial force exerted at the transmission member 22.

The pin portion 22b is inserted through (engaged with) the ditch portion 12a formed at the rotation portion 12, so that the transmission member 22 is operatively associated with the rotation portion 12. Because the ditch portion 12a has the approximate helical shape, the rotation portion 12 will be rotated responding to a sliding of the transmission member 22 in the axis direction of the shaft 21a. Thus, the door 10 is operated.

According to this embodiment, because the driving motor 30 is integrated with the transmission member 22, the door driving system can become compacter and lighter.

In this case, the structure of the door driving system which has not been described here is the same with the first embodiment.

Other Embodiment

Although the present invention has been fully described in connection with the preferred embodiments thereof with reference to the accompanying drawings, it is to be noted that various changes and modifications will become apparent to those skilled in the art.

In the first and second embodiments, the driving shaft 30a of the driving motor 30 is coaxially connected with the rotation shaft 21 of the transmission mechanism 20. The driving shaft 30a can be also connected with the rotation shaft 21 through a universal joint 40 (free joint), referring to FIG. 6. Thus, the door 10 can be mounted in the case 1 at a preferred position. In this case, the universal joint 40 can be also arranged at an opposite end of the rotation shaft 21 with respect to the driving shaft 30a.

In the above-described embodiments, the driving motor 30 is constructed of the DC motor. However, the driving motor 30 can be also constructed of a step motor to have a potentiometer function for detecting a rotation position. The rotation position can be also detected through a pulse calculation performed by a commutator, in the case where the DC motor is used as the driving motor 30.

The door driving system described in the present invention can be also used for any door which needs to rotate.

Such changes and modifications are to be understood as being in the scope of the present invention as defined by the appended claims.

What is claimed is:

1. A door driving system comprising:
   a door having a body portion and a rotation portion, the rotation portion having an approximate cylinder shape and the rotation portion being integrally rotatable with the body portion;
   a transmission mechanism which is arranged at an inner side of the rotation portion to operate the door; and
   a motor which exerts a rotation force to the transmission mechanism, wherein
   the transmission mechanism converts the rotation force to an axial force in an axis direction of the motor, and then converts the axial force to a driving force for rotating the rotation portion; and
   the door is rotatably mounted in a case to control an air flow through an air passage defined by the case.

2. The door driving system according to claim 1, wherein the transmission mechanism includes a first conversion unit for converting the rotation force to the axial force, and a second conversion unit for converting the axial force to the driving force for rotating the rotation portion.

3. The door driving system according to claim 2, wherein the first conversion unit includes:
   a rotation shaft which is rotatably mounted at the inner side of the rotation portion and driven by the rotation force of the motor, the rotation shaft having a thread formed on a surface thereof; and
   a transmission member including a screw portion which is engaged with the thread, the transmission member sliding in an axis direction of the rotation shaft in response to rotation of the rotation shaft.

4. The door driving system according to claim 3, wherein the motor is arranged at the inner side of the rotation portion and connected with the rotation shaft.

5. The door driving system according to claim 4, wherein the motor is connected with the rotation shaft through a universal joint.

6. The door driving system according to claim 2, wherein the first conversion unit includes:
   a shaft which is fixed at the inner side of the rotation portion of the door, the shaft having a thread formed on a surface thereof; and
   a transmission member having a screw portion, wherein the screw portion is engaged with the thread, so that the transmission member slides along the shaft in response to a rotation of the screw portion.

7. The door driving system according to claim 6, wherein the motor is integrated with the transmission member.

8. The door driving system according to claim 1, wherein the motor is one of a DC motor and a step motor.

9. A door driving system comprising:
a door having a body portion and a rotation portion, the rotation portion having an approximate cylinder shape and the rotation portion being integrally rotatable with the body portion;
a transmission mechanism which is arranged at an inner side of the rotation portion to operate the door; and
a motor which exerts a rotation force to the transmission mechanism, wherein
the transmission mechanism converts the rotation force to an axial force in an axis direction of the motor, and then converts the axial force to a driving force for rotating the rotation portion;
the transmission mechanism includes a first conversion unit for converting the rotation force to the axial force, and a second conversion unit for converting the axial force to the driving force for rotating the rotation portion;
the first conversion unit includes:
a rotation shaft which is rotatably mounted at the inner side of the rotation portion and driven by the rotation force of the motor, the rotation shaft having a thread formed on a surface thereof; and
a transmission member including a screw portion which is engaged with the thread, the transmission member sliding in an axis direction of the rotation shaft in response to rotation of the rotation shaft; and
the second conversion unit includes:
a pin portion which is integrated with the transmission member; and
a ditch portion which is formed on the rotation portion, the ditch portion extending approximately helically with respect to the axis direction of the rotation portion, wherein
the pin portion is engaged with the ditch portion to be operatively associated with the rotation portion, so that the rotation portion is rotated in response to the sliding of the transmission member.

10. The door driving system according to claim 9, wherein the transmission member further has a guide unit for guiding the pin portion to a motion in the axis direction of the rotation portion.

11. The door driving system according to claim 10, wherein:
the pin portion has an approximately stick shape and is inserted through the ditch portion, so that an end of the pin portion protrudes from an outer surface of the rotation portion of the door; and
the guide unit is inserted through a guide hole formed at the end of the pin portion.

* * * * *